US010583588B2

(12) United States Patent
Karau

(10) Patent No.: US 10,583,588 B2
(45) Date of Patent: Mar. 10, 2020

(54) MANUFACTURED RETAINING WALL BLOCK WITH IMPROVED FALSE JOINT

(71) Applicant: PAVESTONE, LLC, Atlanta, GA (US)

(72) Inventor: William H. Karau, Southlake, TX (US)

(73) Assignee: PAVESTONE, LLC, Atlanta, GA (US)

( * ) Notice: Subject to any disclaimer, the term of this patent is extended or adjusted under 35 U.S.C. 154(b) by 0 days.

(21) Appl. No.: 15/978,891

(22) Filed: May 14, 2018

(65) Prior Publication Data
US 2018/0257271 A1 Sep. 13, 2018

Related U.S. Application Data

(63) Continuation-in-part of application No. 15/688,784, filed on Aug. 28, 2017, now Pat. No. 9,999,993,
(Continued)

(51) Int. Cl.
*E02D 29/02* (2006.01)
*B29C 41/36* (2006.01)
(Continued)

(52) U.S. Cl.
CPC ............ *B29C 41/36* (2013.01); *B28B 7/00* (2013.01); *B28B 7/0097* (2013.01); *B28B 7/183* (2013.01);
(Continued)

(58) Field of Classification Search
CPC . B28B 7/007; E04C 1/00; E04C 1/395; E02D 29/0266; E02D 29/02;
(Continued)

(56) References Cited

U.S. PATENT DOCUMENTS 415,773 A * 11/1889 Fiske ................... E04F 13/0864
52/316
470,788 A * 3/1892 Devine .................... B25D 1/02
125/40
(Continued)

FOREIGN PATENT DOCUMENTS

CN 201620509 11/2010
GB 924290 4/1963
(Continued)

OTHER PUBLICATIONS

Kronium; City Truck; Pflaster—und Plattensystem fur hohere Aufgaben; Sep. 21, 2012, 19 pages.
(Continued)

*Primary Examiner* — Patrick J Maestri
(74) *Attorney, Agent, or Firm* — Jackson Walker LLP; Christopher J. Rourk

(57) ABSTRACT

A retaining wall block having a false joint and a system of retaining wall blocks. The retaining wall block includes a body having a first textured surface and a second textured surface and a false joint dividing the first and second textured surface. The false joint can have a depth divided by the width greater than two inches. The false joint can have an interior angle of less than ten degrees. The system includes a plurality of retaining wall blocks and a first course of retaining wall blocks engaged with a second course of retaining wall blocks below. Each block in the system comprising a front face having a first textured surface and a second textured surface and a false joint dividing the first and second textured surface. The false joint can extend a predetermined depth of a third surface.

17 Claims, 8 Drawing Sheets

Related U.S. Application Data which is a continuation of application No. 15/074,830, filed on Mar. 18, 2016, now Pat. No. 9,744,697, which is a continuation of application No. 14/311,194, filed on Jun. 20, 2014, now abandoned, application No. 15/978,891, which is a continuation-in-part of application No. 15/080,276, filed on Mar. 24, 2016, now abandoned, which is a continuation of application No. 29/543,176, filed on Oct. 21, 2015, now Pat. No. Des. 791,346.

(60) Provisional application No. 61/838,205, filed on Jun. 21, 2013.

(51) Int. Cl.
  *E04C 1/39* (2006.01)
  *E04B 2/32* (2006.01)
  *B28B 7/18* (2006.01)
  *B28B 7/00* (2006.01)
  *E04C 1/00* (2006.01)
  *E04B 2/02* (2006.01)

(52) U.S. Cl.
  CPC ........... *E02D 29/02* (2013.01); *E02D 29/025* (2013.01); *E02D 29/0266* (2013.01); *E04B 2/32* (2013.01); *E04C 1/00* (2013.01); *E04C 1/395* (2013.01); *E04B 2002/0208* (2013.01); *E04B 2002/0269* (2013.01)

(58) Field of Classification Search
  CPC . E02D 29/025; E04B 2/32; E04B 2002/0269; E04B 2002/0208
  See application file for complete search history.

(56) References Cited

U.S. PATENT DOCUMENTS

| | | |
|---|---|---|
| 511,098 A * 12/1893 | Schultz | F25C 1/24 249/52 |
| 534,462 A * 2/1895 | Baisley | 52/566 |
| 787,199 A * 4/1905 | Lloyd | B29C 45/14385 264/157 |
| 803,014 A * 10/1905 | McIlravy | B28B 7/183 249/64 |
| 806,951 A * 12/1905 | Bryning | B28D 1/127 125/17 |
| 836,017 A * 11/1906 | Douglass | E04B 2/14 52/607 |
| 926,767 A * 7/1909 | Rehaut | E04B 2/18 52/592.5 |
| 1,032,858 A | 7/1912 | Pettit |
| 1,086,975 A | 2/1914 | Aaronson |
| 1,092,621 A | 4/1914 | Worner |
| 1,272,533 A | 7/1918 | Robinson |
| 1,287,055 A | 12/1918 | Lehman |
| 1,451,340 A | 4/1923 | Kroonen |
| 1,534,353 A | 4/1925 | Besser |
| 1,538,200 A | 5/1925 | Melton |
| 1,572,887 A | 2/1926 | Dale |
| 1,758,903 A | 5/1930 | Willetts |
| 1,872,522 A | 8/1932 | Stuckey |
| 1,893,430 A | 1/1933 | McKenzie |
| 2,151,468 A | 3/1939 | Henderson |
| 2,203,935 A | 6/1940 | Hedlund |
| 2,219,606 A | 10/1940 | Schoick |
| 2,313,363 A | 3/1943 | Schmitt |
| 2,319,154 A | 5/1943 | Orlow |
| 2,593,606 A | 4/1952 | Price |
| 2,657,681 A | 11/1953 | Gatzke |
| 2,745,276 A | 5/1956 | Kuhlman |
| 2,746,447 A | 5/1956 | Petch |
| 2,775,326 A | 12/1956 | Better et al. |
| 2,867,205 A | 1/1959 | Vesper |
| 2,881,753 A | 4/1959 | Entz |
| 2,925,080 A | 2/1960 | Smith |
| 3,095,868 A | 7/1963 | Mangis |
| 3,120,842 A | 2/1964 | Cox et al. |
| 3,392,719 A | 7/1968 | Clanton et al. |
| 3,425,105 A | 2/1969 | Guide |
| 3,464,328 A | 9/1969 | Van Der Meijden |
| 3,492,984 A | 2/1970 | Harper |
| 3,559,631 A | 2/1971 | Mangis |
| 3,677,258 A | 7/1972 | Fletcher et al. |
| 3,809,049 A | 5/1974 | Fletcher et al. |
| 3,810,726 A | 5/1974 | Bjorhaag |
| 3,923,410 A | 12/1975 | Jordan et al. |
| 3,940,229 A | 2/1976 | Hutton |
| 3,981,953 A | 9/1976 | Haines |
| 4,023,767 A | 5/1977 | Fontana |
| 4,050,864 A | 9/1977 | Komaki |
| 4,098,865 A | 7/1978 | Repasky |
| 4,114,773 A | 9/1978 | Sekiguchi |
| 4,139,593 A | 2/1979 | Holz et al. |
| 4,178,340 A | 12/1979 | Hyytinen |
| 4,185,939 A | 1/1980 | Barth et al. |
| 4,193,718 A | 3/1980 | Wahrendort et al. |
| 4,250,863 A | 2/1981 | Gagnon et al. |
| 4,301,637 A | 11/1981 | Anderson |
| 4,335,549 A | 6/1982 | Dean, Jr. |
| 4,391,312 A | 7/1983 | Sakraida, Jr. |
| 4,426,815 A | 1/1984 | Brown |
| 4,429,506 A | 2/1984 | Henderson |
| 4,524,551 A | 6/1985 | Scheiwiller |
| 4,599,929 A | 7/1986 | Dutina |
| 4,627,764 A | 12/1986 | Scheiwiller |
| 4,770,218 A | 9/1988 | Duerr |
| 4,782,866 A | 11/1988 | Valdez |
| 4,784,821 A | 11/1988 | Leopold |
| D299,067 S | 12/1988 | Forsberg |
| 4,802,320 A | 2/1989 | Forsberg |
| 4,802,836 A | 2/1989 | Whissell |
| 4,834,155 A | 5/1989 | Vuollet |
| 4,840,825 A | 6/1989 | Anstodimou |
| 4,848,309 A | 7/1989 | Alderete |
| 4,869,660 A | 9/1989 | Ruckstuhl |
| 4,936,712 A | 6/1990 | Glickman |
| 4,973,192 A | 11/1990 | Hair |
| D315,026 S | 2/1991 | Castonguay et al. |
| 5,017,049 A | 5/1991 | Sievert |
| 5,028,172 A | 7/1991 | Wilson et al. |
| 5,031,376 A | 7/1991 | Bender et al. |
| 5,056,998 A | 10/1991 | Goossens |
| 5,062,610 A | 11/1991 | Woolford et al. |
| 5,066,070 A | 11/1991 | Clarke |
| 5,078,940 A | 1/1992 | Sayles |
| 5,107,911 A | 4/1992 | Plakotaris |
| 5,139,006 A | 8/1992 | Trudeau |
| 5,152,275 A | 10/1992 | Landhuis |
| 5,158,132 A | 10/1992 | Guillemot |
| 5,217,630 A | 6/1993 | Sayles |
| 5,286,139 A | 2/1994 | Hair |
| 5,294,216 A | 3/1994 | Sievert |
| 5,342,142 A | 8/1994 | Barth et al. |
| D350,610 S | 9/1994 | Rodrigue |
| 5,360,285 A | 11/1994 | Barth et al. |
| 5,413,086 A | 5/1995 | Trudeau |
| D359,367 S | 6/1995 | Ciccarello et al. |
| 5,429,451 A | 7/1995 | Pettee, Jr. |
| 5,441,092 A | 8/1995 | Randle |
| 5,465,542 A | 11/1995 | Terry |
| 5,487,526 A | 1/1996 | Hupp |
| 5,503,498 A | 4/1996 | Scheiwiller |
| 5,534,214 A | 7/1996 | Sakamoto et al. |
| 5,589,124 A | 12/1996 | Woolford et al. |
| D377,181 S | 1/1997 | Hupp |
| D378,702 S | 4/1997 | Blomquist et al. |
| 5,662,094 A | 9/1997 | Giacomelli |
| 5,662,386 A | 9/1997 | Newman et al. |
| 5,687,515 A | 11/1997 | Rodrigues et al. |
| 5,704,183 A | 1/1998 | Ivoolford |
| 5,709,062 A | 1/1998 | Ivoolford |
| 5,709,602 A | 1/1998 | Ivoolford |

(56) References Cited

U.S. PATENT DOCUMENTS

| | | |
|---|---|---|
| 5,711,129 A | 1/1998 | Ivoolford |
| 5,722,386 A | 3/1998 | Fladgard et al. |
| 5,733,470 A | 3/1998 | Roth et al. |
| 5,735,643 A | 4/1998 | Castonguay et al. |
| 5,762,061 A | 6/1998 | Bevan |
| 5,775,838 A | 7/1998 | Pettee, Sr. |
| 5,788,423 A | 8/1998 | Perkins |
| 5,791,389 A | 8/1998 | Valdez |
| 5,795,105 A | 8/1998 | Guth |
| D397,802 S | 9/1998 | Terry |
| 5,816,749 A | 10/1998 | Bailey, II |
| 5,827,015 A | 10/1998 | Woolford et al. |
| D404,146 S | 1/1999 | Perkins |
| 5,878,545 A | 3/1999 | Gebhart |
| 5,879,603 A | 3/1999 | Sievert |
| 5,884,445 A | 3/1999 | Woolford |
| 5,894,702 A | 4/1999 | Stenekes |
| 5,901,520 A | 5/1999 | Abdul-Baki |
| 5,902,069 A | 5/1999 | Barth et al. |
| D411,315 S | 6/1999 | Bolt |
| 5,921,715 A | 7/1999 | Rainey |
| 5,960,604 A | 10/1999 | Blanton |
| D416,627 S | 11/1999 | McAllister |
| 6,010,279 A | 1/2000 | Taylor-Smith |
| 6,018,922 A | 2/2000 | McKinnon |
| 6,029,943 A | 2/2000 | Sievert |
| 6,050,255 A | 4/2000 | Sievert |
| D428,499 S | 7/2000 | Bazzocchi |
| 6,082,057 A | 7/2000 | Sievert |
| 6,102,026 A | 8/2000 | Fladgard et al. |
| D431,305 S | 9/2000 | Barth et al. |
| 6,113,318 A | 9/2000 | Guth |
| 6,113,379 A | 9/2000 | LaCroix et al. |
| 6,134,853 A | 10/2000 | Haener |
| 6,138,983 A | 10/2000 | Sievert |
| 6,142,713 A | 11/2000 | Woolford et al. |
| 6,149,352 A | 11/2000 | MacDonald |
| D435,302 S | 12/2000 | Blomquist et al. |
| D435,304 S | 12/2000 | Rainey |
| 6,168,351 B1 | 1/2001 | Rainey et al. |
| 6,178,704 B1 | 1/2001 | Sievert |
| D437,422 S | 2/2001 | Bolles et al. |
| 6,183,168 B1 | 2/2001 | Woolford et al. |
| D438,640 S | 3/2001 | Bolles |
| 6,199,545 B1 | 3/2001 | Adamson |
| 6,209,848 B1 | 4/2001 | Bolles et al. |
| D442,703 S | 5/2001 | Fifield |
| 6,224,815 B1 | 5/2001 | LaCroix et al. |
| D445,512 S | 7/2001 | Sievert |
| 6,253,519 B1 | 7/2001 | Daniel |
| 6,260,326 B1 | 7/2001 | Muller-Hartburg |
| 6,263,633 B1 | 7/2001 | Hagenah |
| D448,861 S | 10/2001 | Daniels et al. |
| 6,309,716 B1 | 10/2001 | Fisher et al. |
| 6,312,197 B1 | 11/2001 | Woolford et al. |
| 6,318,934 B1 | 11/2001 | Borgersen et al. |
| 6,321,740 B1 | 11/2001 | Scherer et al. |
| 6,322,291 B1 | 11/2001 | Rainey |
| 6,338,597 B1 | 1/2002 | Rainey |
| D458,693 S | 6/2002 | Sievert |
| D464,145 S | 10/2002 | Scherer |
| 6,460,534 B1 | 10/2002 | Vasquez et al. |
| 6,464,199 B1 | 10/2002 | Johnson |
| 6,488,448 B1 | 12/2002 | Blomquist et al. |
| 6,490,837 B1 | 12/2002 | Dueck et al. |
| 6,502,569 B1 | 1/2003 | Lee |
| D477,091 S | 7/2003 | Manthei |
| 6,588,168 B2 | 7/2003 | Walters |
| 6,591,547 B1 | 7/2003 | Staten et al. |
| 6,609,545 B1 | 8/2003 | Gelder |
| 6,609,695 B2 | 8/2003 | LaCroix et al. |
| D479,341 S | 9/2003 | Scullion et al. |
| 6,612,784 B2 | 9/2003 | Rainey et al. |
| 6,616,382 B2 | 9/2003 | Woolford et al. |
| D482,133 S | 11/2003 | Scherer et al. |
| 6,652,196 B1 | 11/2003 | Rainey |
| 6,665,994 B1 | 12/2003 | Ruggeri |
| 6,668,816 B1 | 12/2003 | Pedersen et al. |
| 6,679,021 B2 | 1/2004 | Maimon et al. |
| 6,705,190 B2 | 3/2004 | Newnes et al. |
| 6,758,636 B2 | 7/2004 | Rainey et al. |
| 6,854,220 B2 | 2/2005 | Dueck et al. |
| 6,857,244 B2 | 2/2005 | Schmitz |
| 6,862,856 B2 | 3/2005 | Turgeon-Schramm et al. |
| 6,863,469 B2 | 3/2005 | Bolduc et al. |
| 6,874,494 B2 | 4/2005 | Scherer et al. |
| 6,881,463 B2 | 4/2005 | Riccobene |
| D505,733 S | 5/2005 | Castonguay et al. |
| 6,886,551 B2 | 5/2005 | Scherer et al. |
| D506,837 S | 6/2005 | Scherer et al. |
| 6,910,474 B1 | 6/2005 | Scherer |
| 6,910,796 B2 | 6/2005 | Bailey et al. |
| 6,918,715 B2 | 7/2005 | Scherer et al. |
| 6,921,231 B2 | 7/2005 | Rainey et al. |
| 6,923,565 B2 | 8/2005 | Johnson |
| 6,935,812 B2 | 8/2005 | Rainey |
| 6,953,309 B1 | 10/2005 | Tufts et al. |
| D511,578 S | 11/2005 | Mugge et al. |
| 6,962,028 B2 | 11/2005 | Banova |
| 6,964,272 B2 | 11/2005 | Scherer |
| D513,805 S | 1/2006 | Scherer et al. |
| 6,988,847 B2 | 1/2006 | Lazar |
| 6,994,495 B1 | 2/2006 | Carey et al. |
| 7,004,158 B2 | 2/2006 | Scherer et al. |
| D518,578 S | 4/2006 | Mugge et al. |
| 7,037,047 B1 | 5/2006 | Tufts et al. |
| D522,667 S | 6/2006 | Castonguay et al. |
| 7,055,517 B1 | 6/2006 | Kitahara |
| 7,066,167 B2 | 6/2006 | Scherer et al. |
| 7,077,121 B1 | 7/2006 | Havill |
| D529,195 S | 9/2006 | Mugge |
| 7,104,295 B2 | 9/2006 | Heikkinen et al. |
| D529,628 S | 10/2006 | Mugge et al. |
| D530,831 S | 10/2006 | Mugge et al. |
| D532,910 S | 11/2006 | Mugge et al. |
| 7,140,867 B2 | 11/2006 | Scherer et al. |
| 7,146,974 B2 | 12/2006 | Scherer |
| D536,058 S | 1/2007 | Riccobene |
| D537,501 S | 2/2007 | Riccobene |
| D537,959 S | 3/2007 | Castonguay et al. |
| D538,946 S | 3/2007 | Mugge et al. |
| 7,197,855 B2 | 4/2007 | Della Pepa |
| 7,207,146 B1 | 4/2007 | Morrell |
| 7,208,112 B2 | 4/2007 | Scherer |
| D541,950 S | 5/2007 | Mugge et al. |
| D541,951 S | 5/2007 | Mugge et al. |
| D543,642 S | 5/2007 | Castonguay et al. |
| 7,220,078 B2 | 5/2007 | Drost et al. |
| 7,252,081 B2 | 8/2007 | Havill |
| D550,375 S | 9/2007 | Thomassen et al. |
| D553,260 S | 10/2007 | Castonguay et al. |
| RE39,922 E | 11/2007 | Rainey |
| D555,810 S | 11/2007 | Strand |
| D563,566 S | 3/2008 | Aoki |
| 7,360,970 B2 | 4/2008 | Woolford et al. |
| 7,367,167 B2 | 5/2008 | Takayanagi |
| 7,384,215 B2 | 6/2008 | Woolford |
| D576,293 S | 9/2008 | Mugge et al. |
| 7,425,106 B2 | 9/2008 | Altmann et al. |
| 7,428,900 B2 | 9/2008 | Scherer |
| D578,658 S | 10/2008 | Keys |
| D578,659 S | 10/2008 | Keys |
| D578,660 S | 10/2008 | Keys |
| D581,548 S | 11/2008 | Mugge et al. |
| 7,458,800 B2 | 12/2008 | Scherer et al. |
| D584,423 S | 1/2009 | Mugge |
| D587,382 S | 2/2009 | Wauhop |
| 7,484,910 B2 | 2/2009 | Mugge |
| D588,714 S | 3/2009 | Mugge et al. |
| D590,070 S | 4/2009 | Castonguay |
| D590,071 S | 4/2009 | Castonguay |
| D590,072 S | 4/2009 | Castonguay |
| D596,318 S | 7/2009 | Mugge et al. |
| D598,136 S | 8/2009 | Mugge |

(56) References Cited

U.S. PATENT DOCUMENTS

| | | |
|---|---|---|
| D602,173 S | 10/2009 | Thomassen |
| D604,430 S | 11/2009 | Mugge et al. |
| 7,637,688 B2 | 12/2009 | Riccobene |
| D609,367 S | 2/2010 | Mugge et al. |
| D611,164 S | 3/2010 | Mugge |
| 7,674,420 B2 | 3/2010 | Johnson et al. |
| 7,704,434 B2 | 4/2010 | Johnson |
| 7,743,574 B2 | 6/2010 | Tufts et al. |
| D619,734 S | 7/2010 | Mugge et al. |
| D620,616 S | 7/2010 | Ciccarello |
| D620,617 S | 7/2010 | Ciccarello |
| D621,069 S | 8/2010 | Mugge et al. |
| D621,960 S | 8/2010 | Mugge et al. |
| D622,872 S | 8/2010 | Ciccarello |
| 7,766,002 B2 | 8/2010 | Karau |
| 7,775,747 B2 | 8/2010 | Bott |
| D623,809 S | 9/2010 | Nair |
| D623,810 S | 9/2010 | Breit |
| D624,202 S | 9/2010 | Thomassen et al. |
| D624,203 S | 9/2010 | Thomassen et al. |
| D624,205 S | 9/2010 | O'Connor |
| D625,840 S | 10/2010 | Mugge |
| D625,842 S | 10/2010 | Mugge et al. |
| 7,807,083 B2 | 10/2010 | Scherer |
| 7,811,027 B2 | 10/2010 | Scheiwiller |
| 7,849,656 B2 | 12/2010 | Mugge et al. |
| 7,850,394 B2 | 12/2010 | Schroder |
| 7,860,763 B1 | 12/2010 | Schroder |
| 7,870,853 B2 | 1/2011 | Scherer |
| D634,028 S | 3/2011 | Mugge et al. |
| 7,908,799 B2 | 3/2011 | Mugge et al. |
| D636,094 S | 4/2011 | Mugge |
| 7,930,865 B2 | 4/2011 | Barlow |
| D638,957 S | 5/2011 | Mugge et al. |
| D640,800 S | 6/2011 | Thomassen |
| 7,963,727 B1 * | 6/2011 | Wauhop ............. E02D 29/0266 405/284 |
| 7,967,001 B2 | 6/2011 | Scherer et al. |
| 7,972,128 B2 | 7/2011 | Mugge et al. |
| 7,979,251 B2 | 7/2011 | Jakobsen et al. |
| 7,984,600 B2 | 7/2011 | Alford et al. |
| D643,544 S | 8/2011 | Thomassen |
| D643,939 S | 8/2011 | Mugge et al. |
| D643,943 S | 8/2011 | Mugge et al. |
| 8,006,683 B2 | 8/2011 | Scherer et al. |
| D645,165 S | 9/2011 | Wolter et al. |
| D645,573 S | 9/2011 | Dallaire et al. |
| D645,574 S | 9/2011 | Thomassen |
| 8,011,152 B2 | 9/2011 | Thomassen |
| D646,400 S | 10/2011 | Harris |
| D646,402 S | 10/2011 | Mugge |
| D650,094 S | 12/2011 | Mugge et al. |
| D653,772 S | 2/2012 | Mugge et al. |
| 8,128,851 B2 | 3/2012 | Scherer |
| D660,982 S | 5/2012 | Thomassen |
| D662,608 S | 6/2012 | Mugge et al. |
| D662,609 S | 6/2012 | Mugge et al. |
| 8,246,892 B2 | 8/2012 | Tufts et al. |
| 8,251,053 B2 | 8/2012 | Scherer |
| 8,256,182 B2 | 9/2012 | Wolter et al. |
| 8,313,267 B2 | 11/2012 | Johnson et al. |
| 8,327,833 B2 | 12/2012 | Scherer et al. |
| D673,693 S | 1/2013 | Mugge et al. |
| D677,801 S | 3/2013 | Mugge et al. |
| D677,802 S | 3/2013 | Mugge et al. |
| D687,167 S | 7/2013 | Mugge et al. |
| D690,437 S | 9/2013 | Burnquist et al. |
| 8,524,138 B2 | 9/2013 | Johnson |
| 8,540,915 B2 | 9/2013 | Scherer |
| D690,835 S | 10/2013 | Mugge et al. |
| D690,836 S | 10/2013 | Mugge et al. |
| D693,481 S | 11/2013 | Johnson et al. |
| D694,431 S | 11/2013 | Burnquist et al. |
| D694,914 S | 12/2013 | MacDonald |
| D695,915 S | 12/2013 | Dignard et al. |
| D695,916 S | 12/2013 | Dignard et al. |
| D695,917 S | 12/2013 | Dignard et al. |
| D695,918 S | 12/2013 | Dignard et al. |
| D695,919 S | 12/2013 | Dignard et al. |
| D695,920 S | 12/2013 | Dignard |
| D695,921 S | 12/2013 | Dignard |
| D695,922 S | 12/2013 | Dignard |
| 8,677,711 B2 | 3/2014 | Wolter et al. |
| D703,838 S | 4/2014 | Mugge et al. |
| D704,352 S | 5/2014 | Johnson et al. |
| D705,951 S | 5/2014 | Mugge et al. |
| 8,715,557 B2 | 5/2014 | Johnson et al. |
| D729,414 S | 5/2015 | Johnson et al. |
| 9,021,762 B1 | 5/2015 | DePalma |
| D736,952 S | 8/2015 | Thomassen |
| 9,404,226 B2 | 8/2016 | Dignard et al. |
| D791,346 S | 7/2017 | Karau |
| 9,744,697 B2 | 8/2017 | Karau |
| 2002/0015620 A1 | 2/2002 | Woolford et al. |
| 2002/0038532 A1 | 4/2002 | Huberty |
| 2002/0092257 A1 | 7/2002 | Scherer et al. |
| 2003/0180099 A1 | 9/2003 | Scherer et al. |
| 2004/0067103 A1 | 4/2004 | Hart |
| 2005/0081470 A1 | 4/2005 | Utsunomiya |
| 2006/0054154 A1 | 3/2006 | Scherer |
| 2006/0059839 A1 | 3/2006 | Azar |
| 2006/0230701 A1 | 10/2006 | Pepa |
| 2007/0077387 A1 | 4/2007 | Riccobene |
| 2007/0217865 A1 | 9/2007 | Castonguay et al. |
| 2008/0060300 A1 | 3/2008 | Westmoreland et al. |
| 2008/0092869 A1 | 4/2008 | Karau |
| 2008/0096471 A1 | 4/2008 | Karau |
| 2008/0098686 A1 | 5/2008 | Metten |
| 2008/0260474 A1 | 10/2008 | Koster |
| 2008/0276562 A1 | 11/2008 | Stuchell |
| 2009/0103987 A1 | 4/2009 | MacDonald |
| 2009/0188186 A1 | 7/2009 | Ebanks |
| 2009/0308015 A1 | 12/2009 | MacDonald et al. |
| 2009/0313933 A1 | 12/2009 | Clear |
| 2010/0043335 A1 | 2/2010 | O'Connor |
| 2010/0162648 A1 | 7/2010 | Thomassen |
| 2010/0307092 A1 | 12/2010 | Bouchard et al. |
| 2010/0322709 A1 | 12/2010 | Ciccarello |
| 2011/0078978 A1 | 4/2011 | Wauhop |
| 2011/0162314 A1 | 7/2011 | Leach et al. |
| 2011/0293873 A1 | 12/2011 | Riccobene |
| 2011/0318100 A1 | 12/2011 | Rainey |
| 2012/0057933 A1 | 3/2012 | Gebhart |
| 2013/0111842 A1 | 5/2013 | Long et al. |
| 2014/0270988 A1 | 9/2014 | Riccobene et al. |
| 2014/0373479 A1 | 12/2014 | Karau |
| 2015/0176224 A1 | 6/2015 | Dignard et al. |
| 2017/0114504 A1 | 4/2017 | Karau |

FOREIGN PATENT DOCUMENTS

| | | |
|---|---|---|
| GB | 948121 | 1/1964 |
| GB | 1509747 | 5/1978 |
| RU | 2011819 | 4/1994 |
| RU | 2198095 | 2/2003 |
| WO | 2008015407 | 2/2008 |
| WO | 2008033157 | 3/2008 |
| WO | 2010013991 | 2/2010 |

OTHER PUBLICATIONS

"Coronado Installation Guide", Oct. 21, 2011, accessed from www.coronado.com on Jan. 20, 2016, 16 pages.

"Haith Robot System for Aggregate Industries," http://www.hub-4.com/news/109/haith-robot-system-for-aggregate-ndustries, Jul. 31, 2006, 2 pages.

"Reconstituted Stone—Stone Pitchers," http://www.haithindustrial.eo.uk/index.php?sec=cont&id=26, Jul. 31, 2006, 1 page.

"Natural Stone—Block and Slab Splitting," http://www.haithindustrial.eo.uk/index.php?sec=cont&id=32, Jul. 31, 2006, 2 pages.

"Splitting, Cutting, Marking & Layout," http://www.pavetech.com/newtools/cutting.shtm, Jul. 31, 2006, 2 pages.

(56) References Cited

OTHER PUBLICATIONS

"Stone Splitter," http://www.pavetech.com/newtools/stonesplitter.shtm, Jul. 31, 2006, 2 pages.
"Splitters/Turnovers", http://www.besser.com/equipment/splitters/, Aug. 3, 2006, 2 pages.
"Split-Face Concrete Block", http://www.toolbase.org/Technology-Inventory/walls/split-face-concrete-block, Aug. 3, 2006, 4 pages.
Belgard—"Enhance Your Environment with Belgard—The Celtik Wall System Retaining Wall"; Mar. 1998, 9 pages.
The Office Action issued by the Canadian Intellectual Property Office dated Jan. 17, 2017 for the co-pending Canadian Design patent application No. 2,926,108, 5 pages.
The Reply in response to the Office Action dated Jan. 17, 2017 filed with the Canadian Intellectual Property on Office dated Jun. 26, 2017 for the co-pending Canadian Design patent application No. 2,926,108, 41 pages.
The Office Action issued by the Canadian Intellectual Property Office dated Jun. 16, 2016 for corresponding Canadian Patent Application No. 2,855,102, 4 pages.
The Reply in response to the Office Action dated Jun. 16, 2016 filed on Nov. 30, 2016 with the Canadian Patent Office for the co-pending Canadian patent application No. 2,855,102, 14 pages.
The Notice of Allowance issued by the Canadian Intellectual Property Office dated Jun. 23, 2016 for corresponding Canadian Patent Application No. 2,854,940, 1 page.

\* cited by examiner

MANUFACTURED RETAINING WALL BLOCK WITH IMPROVED FALSE JOINT

RELATED APPLICATIONS

The present application is a continuation-in-part of U.S. patent application Ser. No. 15/688,784, filed Aug. 28, 2017, which is a continuation of U.S. patent application Ser. No. 15/074,830, filed Mar. 18, 2016, now U.S. Pat. No. 9,744,697, issued Aug. 29, 2017, which is a continuation of U.S. patent application Ser. No. 14/311,194, filed Jun. 20, 2014, which claims priority to U.S. Provisional Patent Application No. 61/838,205, filed on Jun. 21, 2013, and is also a continuation-in-part of U.S. patent application Ser. No. 15/080,276, filed Mar. 24, 2016, which is a continuation of U.S. Design Application No. 29/543,176, filed Oct. 21, 2015, now U.S. Design Pat. No. D791,346, issued Jul. 4, 2017, which are hereby incorporated by reference for all purposes as if set forth herein in their entirety.

TECHNICAL FIELD

The present disclosure relates to retaining wall blocks, and more specifically to a retaining wall block having a false joint and a mold for manufacturing such.

BACKGROUND OF THE INVENTION

Retaining wall blocks can be manufactured and arranged in a variety of different ways.

SUMMARY OF THE INVENTION

A manufactured retaining wall block with an improved false joint and a system of retaining wall blocks with an improved false joint is presented herein.

In an embodiment, a retaining wall block having a false joint is presented. The retaining wall block comprises a body having a first surface and a second surface and a false joint dividing the first and second surface and extending a predetermined depth of the body.

In another embodiment, the first and second surface can be textured. The false joint can have a depth divided by the width that is less than a predetermined value. The false joint can also have an exterior angle that is greater than an interior angle. The retaining wall block can also include a base below the body that has at least one ridge to produce at least one engagement cavity. The body and the base can define an H-shaped dimension.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views, and in which.

DETAILED DESCRIPTION OF THE INVENTION

Figure 1A:
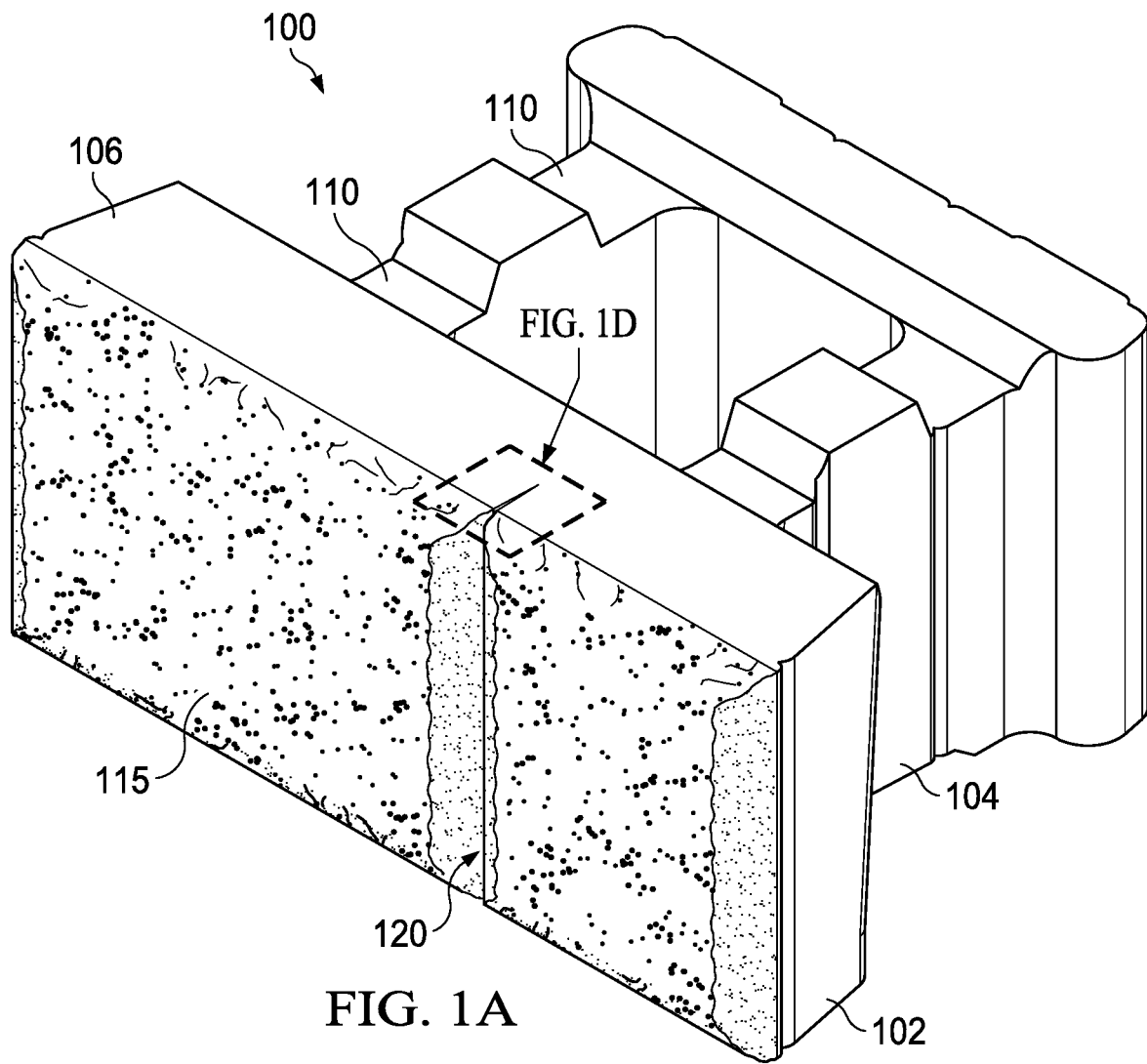
FIGS. 1A through 1D are diagrams of a retaining wall blocks with false joints in accordance with an example embodiment of the present disclosure.

In the description that follows, like parts are marked throughout the specification and drawings with the same reference numerals. The drawing figures might or might not be to scale and certain components can be shown in generalized or schematic form and identified by commercial designations in the interest of clarity and conciseness.

Figure 1B:
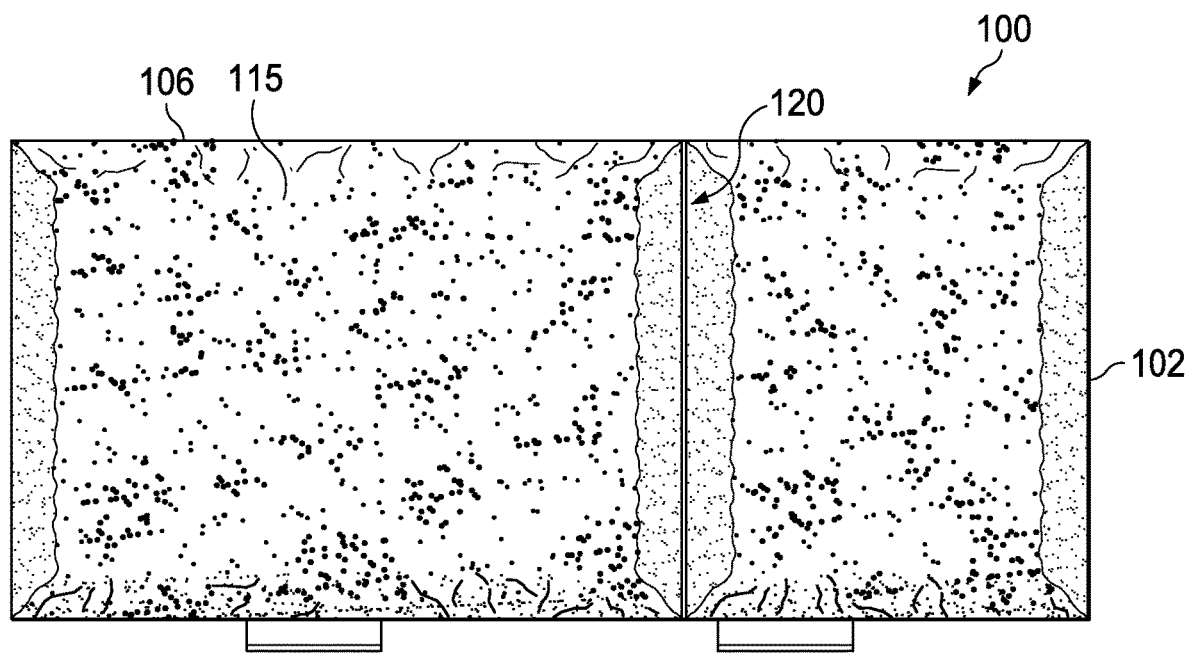
Figure 1C:
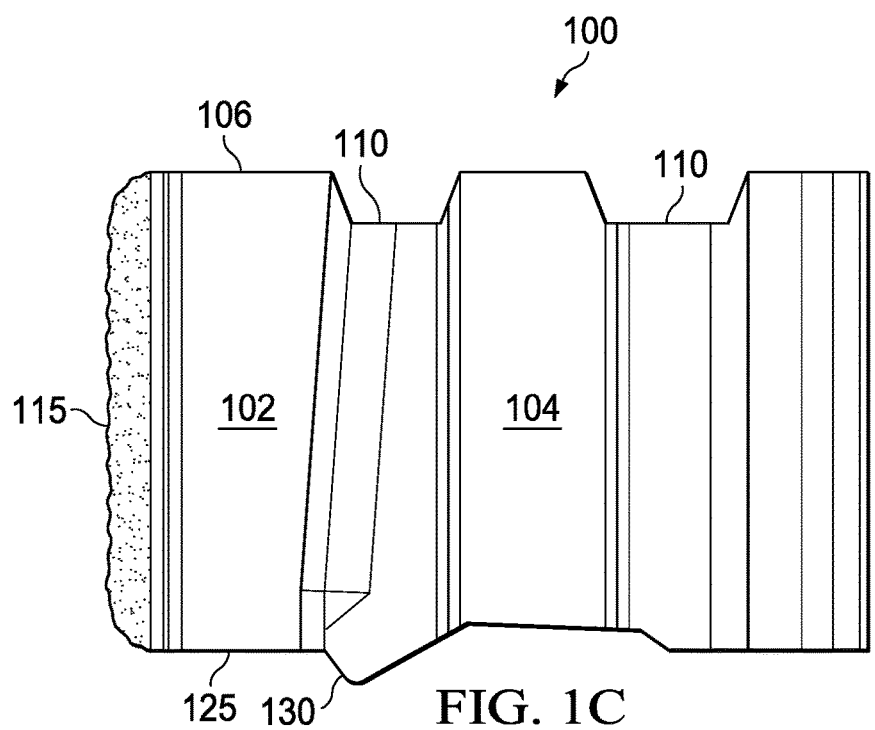

FIGS. 1A through 1C are diagrams of a retaining wall block 100 in accordance with an example embodiment of the present disclosure. Retaining wall block 100 can be formed from masonry, concrete or other suitable materials, using a wet cast process, a dry cast process or other suitable processes. As shown in FIG. 1A, retaining wall block 100 includes a body 102, a base 104, a top face 106, engagement cavity 110, and textured front face 115. Textured front face 115 can be formed by splitting retaining wall block 100 from a second retaining wall block 100, as discussed in greater detail below.

As shown in FIGS. 1A and 1B, front face 115 includes a false joint 120. The false joint 120 can extend the width of the body 102 along the front face 115 and a depth of the body 102. The false joint 120 can be located anywhere along the front face 115 of the body 102 and can be extended to different depths of the body 102. As is more clearly shown in FIG. 1D, the false joint 120 can have an exterior false joint section having an apparent angle β and an interior false joint section having an apparent angle α. The false joint 120 can have an interior false joint width W and an interior false joint depth D and a depth divided by width (D/W) of greater than a predetermined amount, such as 2 to 3, depending on the size of the body 102, or other suitable amounts. The width W can be equal to or less than 3 mm or other suitable values. The false joint 102 can have a depth of about a third of the depth of the body 102, or other suitable depths. The apparent angle α of false joint 120 can range from less than 10° to greater than 20°, and the apparent angle β of false joint 120 can range from less than 60° to greater than 80°. A transition region between the interior false joint section and the exterior false joint section can have a thickness t, where t can be less than or equal to a predetermined value, such as 8 mm, or other suitable values. Furthermore, the body 102 can include multiple false joints 120. Alternate interior and exterior portions are shown as alternatives.

As shown in FIG. 1C, which is a side view of retaining wall block 100, retaining wall block 100 can also include a bottom surface 125 having at least one engagement protrusion 130. Engagement protrusion 130 is configured to interface with engagement cavity 110 of an underlying retaining wall block 100. Furthermore, the front engagement cavity 110 is offset from the location of engagement protrusion 130, so as to result in a staggered incline as successive rows of retaining wall blocks 100 are formed. In one embodiment of the present disclosure, the incline of successive rows of retaining wall blocks 100 is generally vertical with no staggering.

Figure 2A:
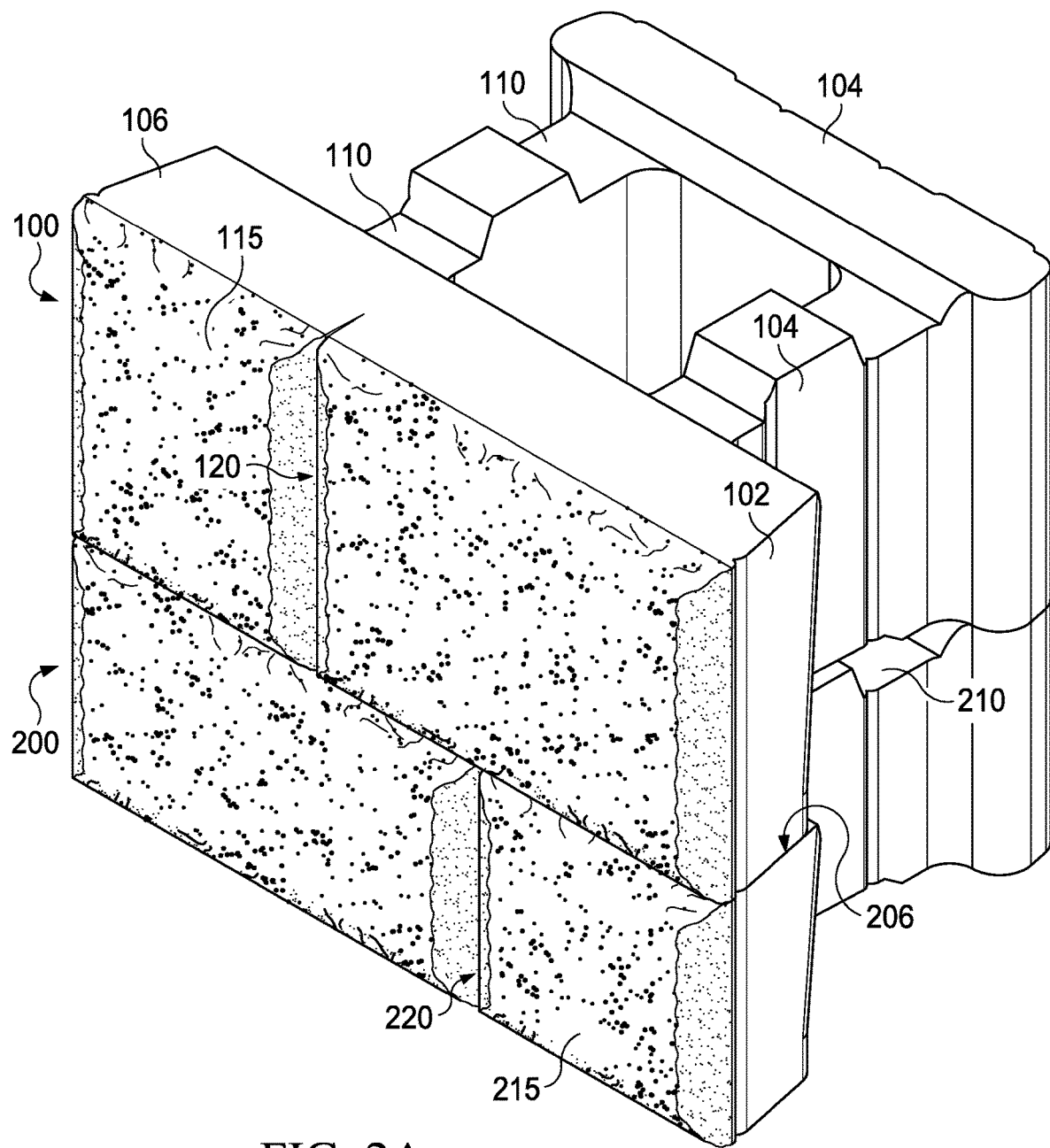
FIGS. 2A through 2C are diagrams of engaged retaining wall blocks with false joints in accordance with an example embodiment of the present disclosure.
Figure 2B:
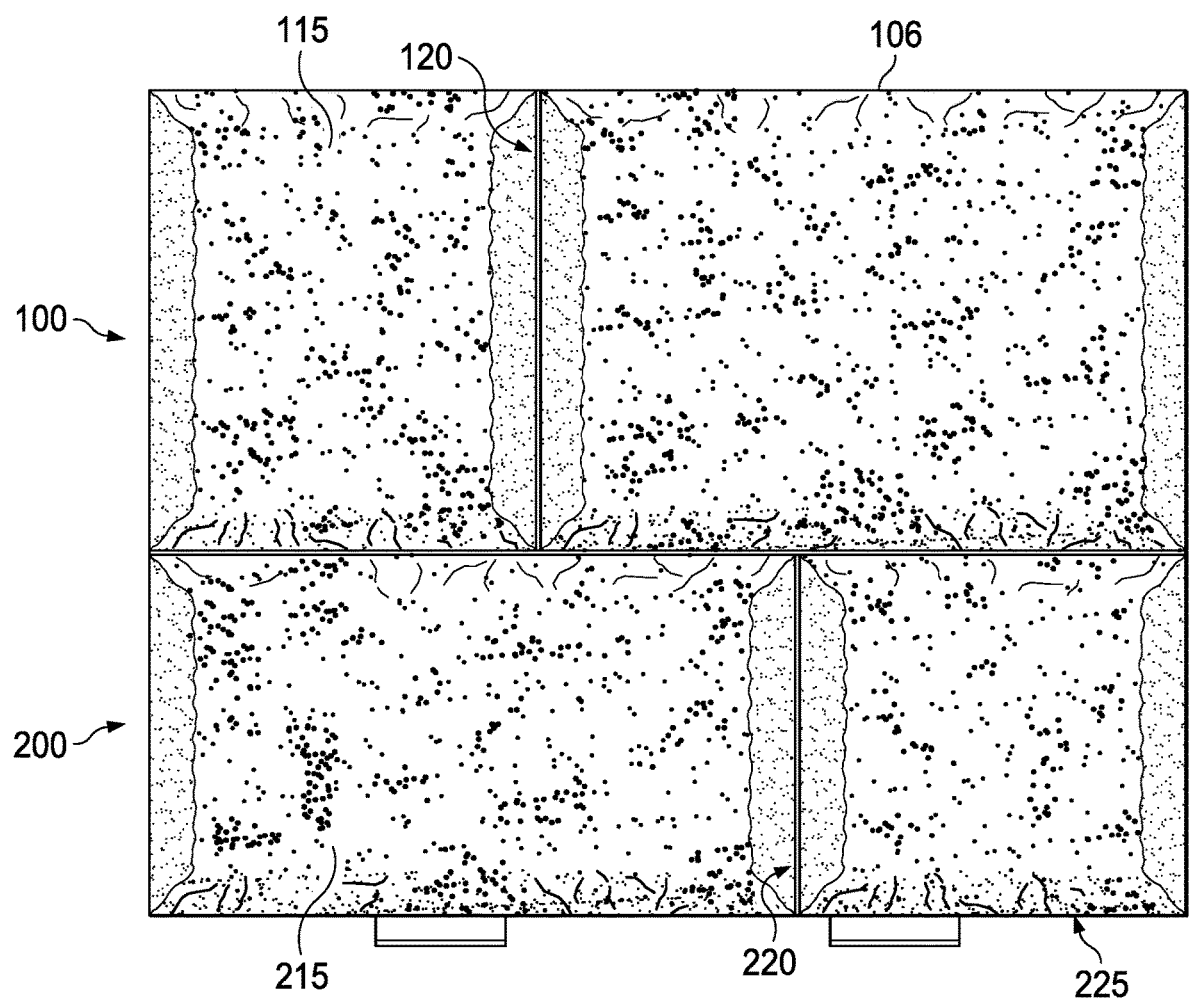
Figure 2C:
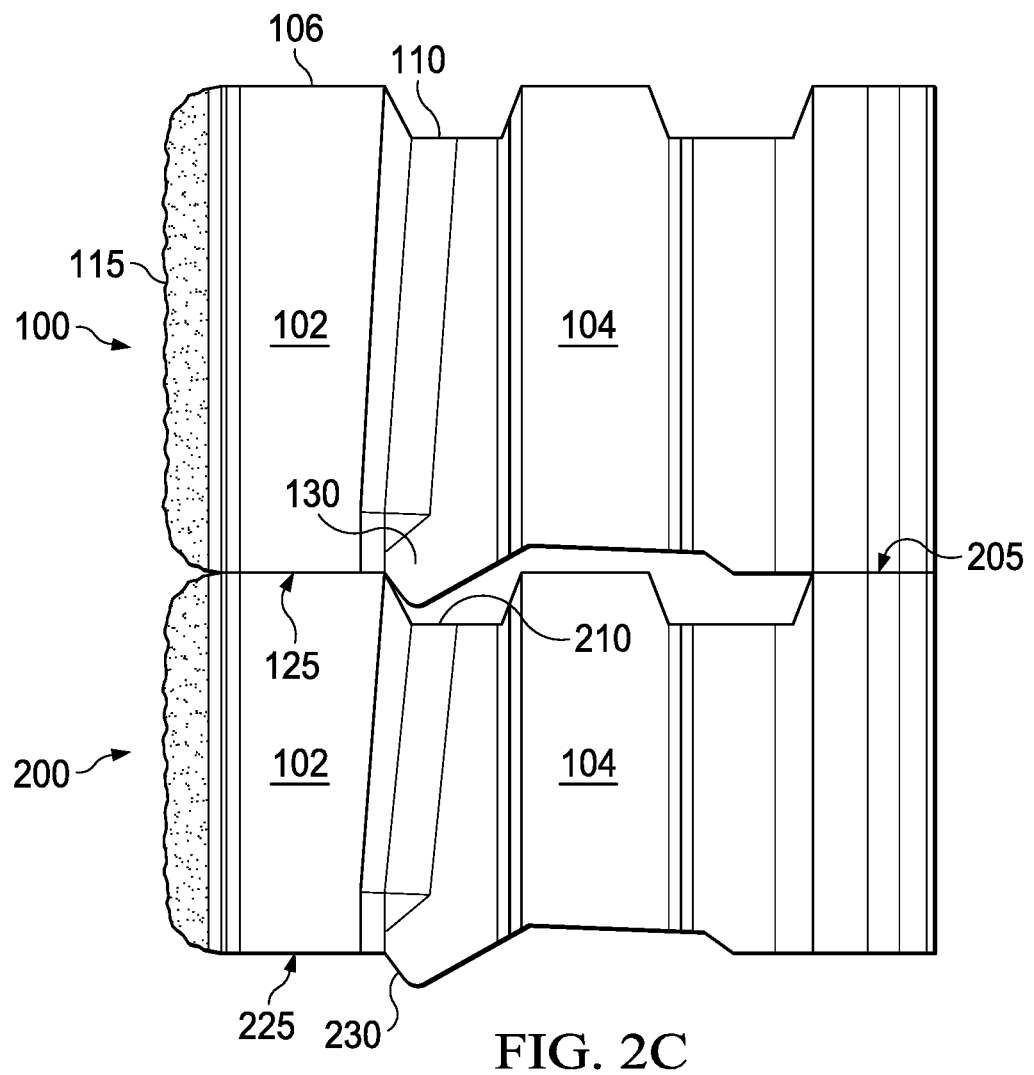

FIGS. 2A through 2C are diagrams of engaged retaining wall blocks 100 and 200, in accordance with an example embodiment of the present disclosure. As shown in FIG. 2A, retaining wall blocks 100 and 200 can have different sizes and can include top faces 106 and 206, respectively, engagement cavities 110 and 210, respectively, and textured front faces 115 and 215, respectively. As previously discussed, retaining wall blocks 100 and 200 also include false joints 120 and 220, as shown in FIGS. 2A and 2B Likewise, other suitable false joints can also or alternatively be used.

In one embodiment of the present disclosure, first retaining wall block 100 is disposed onto a top surface 206 of a second retaining wall block 200. As shown in FIG. 2C, first retaining wall block 100 can positioned so that engagement protrusions 130 align with and fit into engagement cavity 210 of second retaining wall block 200. In one embodiment of the present disclosure, the angle and configuration of engagement notches 110 and 210 and engagement members 130 and 230 can be varied to allow the blocks 100, 200 to be assembled with an offset. In one example embodiment of the present disclosure, the angle of engagement notches 110 and 210 can be between about 30 degrees and about 90 degrees. Likewise, the angle of engagement members 130 and 230 can be between about 30 degrees and about 90 degrees.

Figure 3:
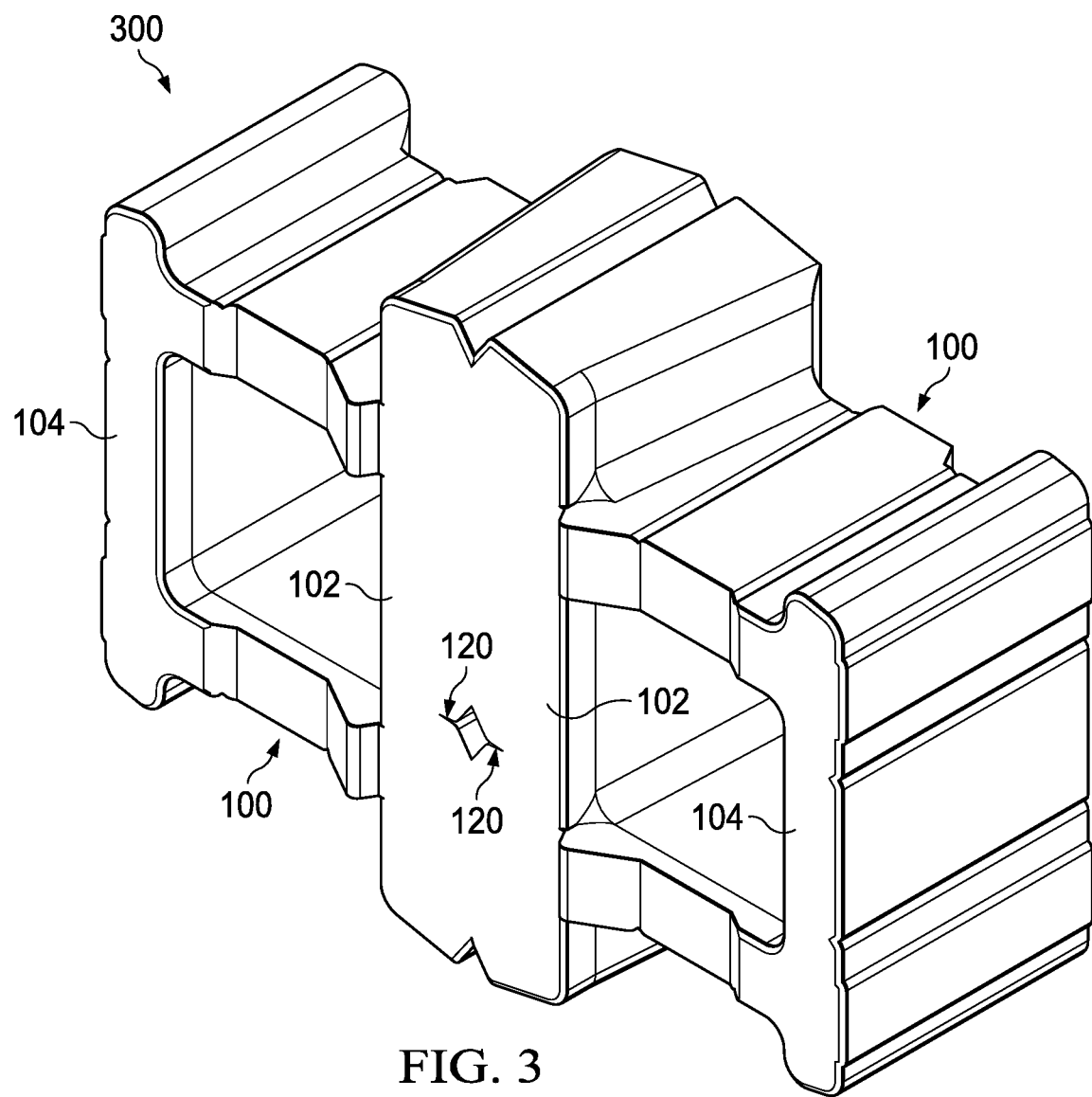
FIG. 3 is a diagram of molded retaining walls blocks with each having a false joint in accordance with an example embodiment of the present disclosure.

FIG. 3 is a diagram of a retaining wall block 300 with false joints 120 formed in the molded product, prior to splitting, in accordance with an example embodiment. Block 300 includes a first block having a body 102 and base 104 casted with a second block having a body 102 and base 104. The individual blocks 100 can be formed by splitting block 300 at the centerline, through the diamond shaped aperture segmenting the false joints 120. The false joints 120 described herein can be cast within the mold at different suitable depths and at different suitable widths, and at varying suitable locations within body 102 corresponding to selected false joint locations.

Figure 1D:
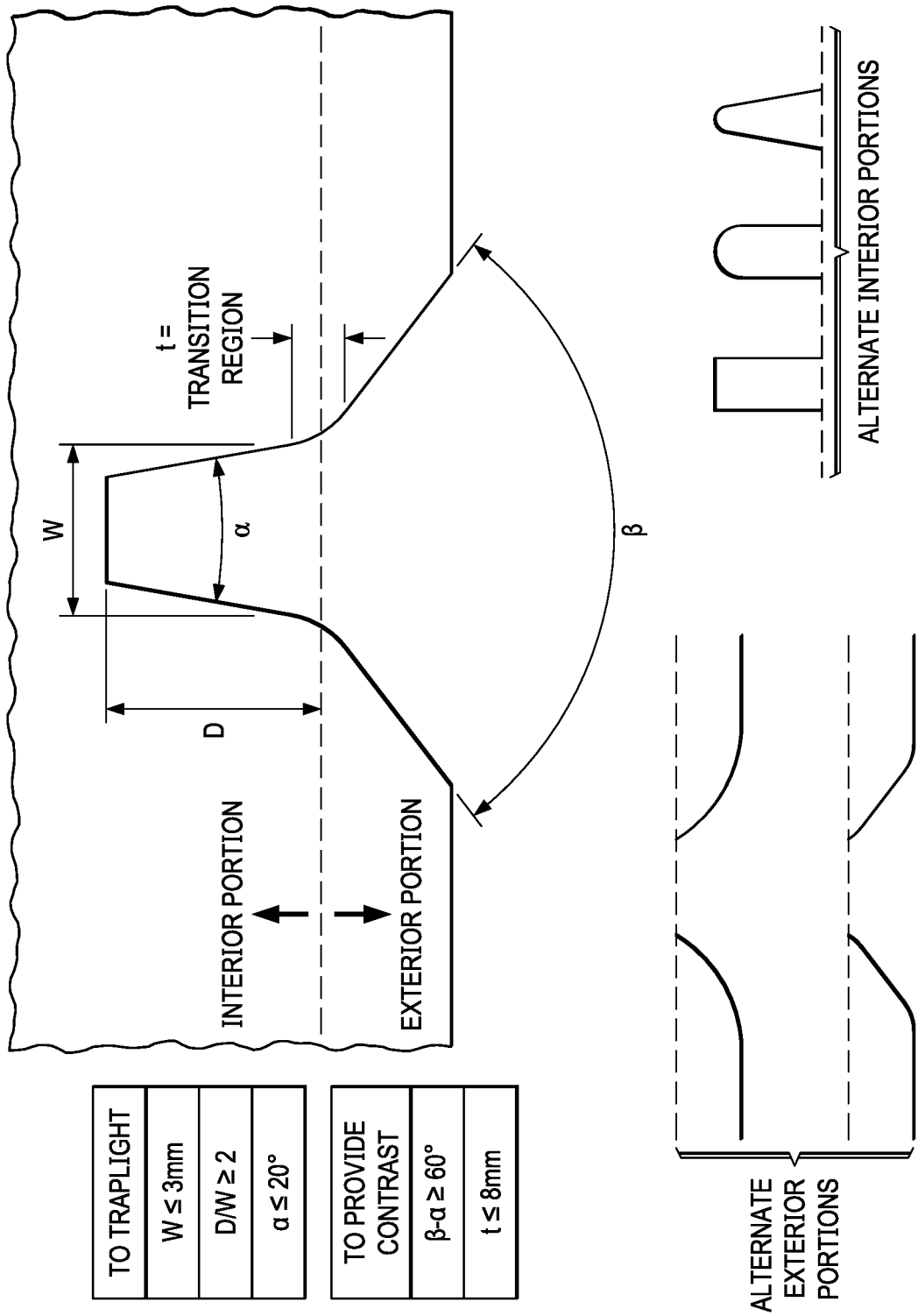
Figure 4:
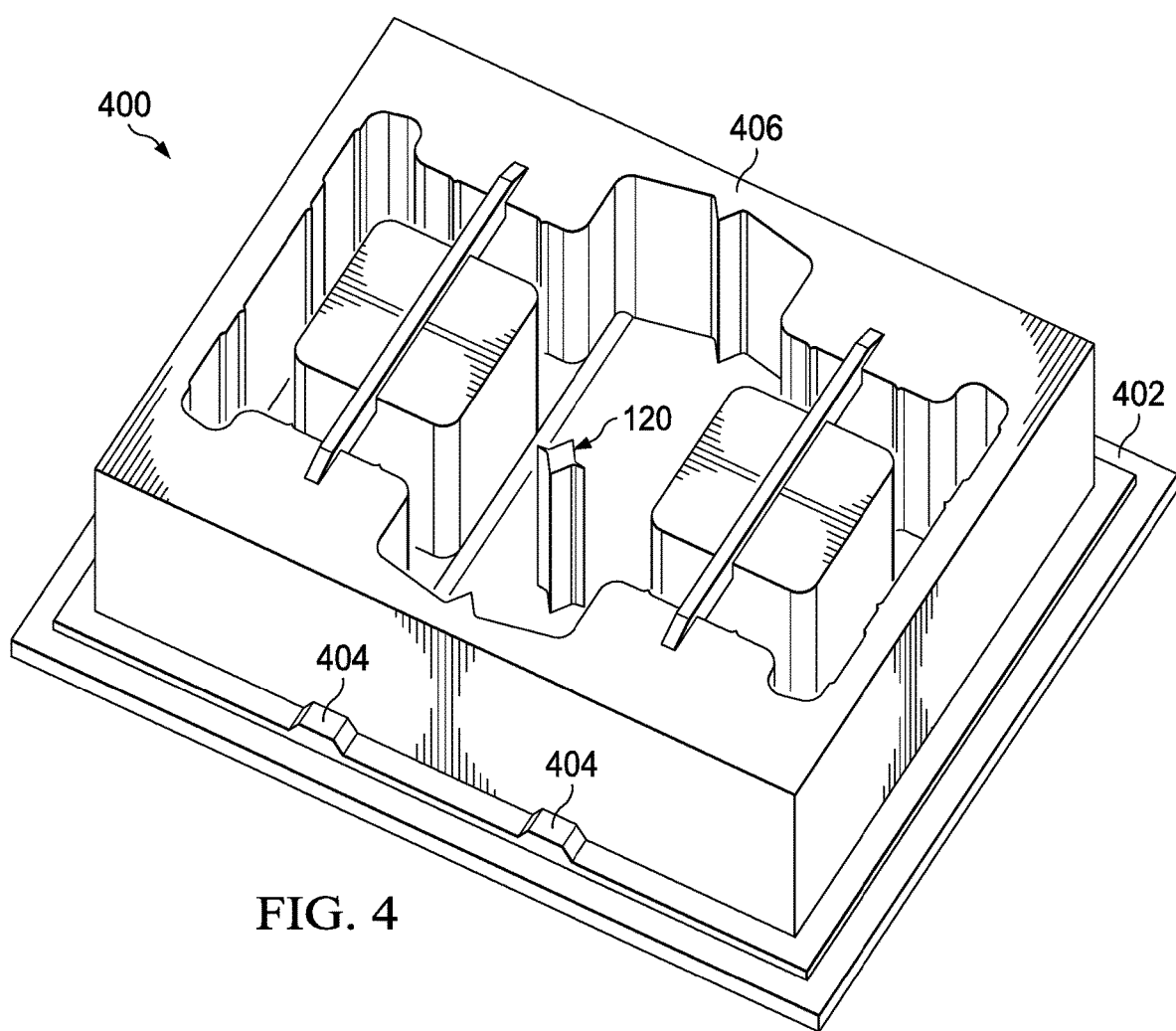
FIG. 4 is a diagram of a mold for providing a false joint, in accordance with an example embodiment of the present disclosure.

FIG. 4 is a diagram of a mold 400 for providing a false joint, in accordance with an example embodiment of the present disclosure. Mold 400 includes base 402, index notches 404, outer frame 406 and false joint 120 frame. When masonry compound or other suitable wet or dry mixes are added to the cavity of mold 400, false joint 120 frame creates a false joint feature, such as shown in FIG. 1D or other suitable false joints. After the block is formed by mold 400, mold 400 can be removed to allow the wet or dry mix to set and cure. False joint 120 frame can be coupled to mold 400 (not explicitly shown), or can be secured in another suitable manner to allow it to be withdrawn prior to setting.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A retaining wall block comprising:
   a body having a first surface and a second surface; and
   a false joint dividing the first and second surface and extending a predetermined depth of the body, wherein the false joint includes a tapered interior portion having a first taper angle, a tapered exterior portion having a second taper angle and a transition region where the second taper angle reduces to the first taper angle;
   wherein the false joint has an interior angle of less than 20 degrees that extends for a predetermined distance over a length in the false joint.

2. The retaining wall block of claim 1 wherein a depth of the tapered interior portion of the false joint divided by a width of the tapered interior portion of the false joint is greater than 2.

3. The retaining wall block of claim 1 wherein a depth of the tapered interior portion of the false joint divided by a width of the tapered interior portion of the of the false joint is less than 3.

4. The retaining wall block of claim 1 wherein the false joint has an exterior angle of greater than 40 degrees that extends for a predetermined distance over a length in the false joint.

5. The retaining wall block of claim 1 wherein the first and second surface are textured.

6. The retaining wall block of claim 1 wherein the false joint extends at least a third of a depth of the body.

7. The retaining wall block of claim 1 further comprising:
   a base behind the first surface and the second surface of the body and having at least one ridge to produce at least one engagement cavity.

8. The retaining wall block of claim 7 wherein the body and base define an H-shaped structure.

9. A system of retaining wall blocks, the system comprising:
   a plurality of retaining wall blocks, each block comprising:
      a front face having a first surface and a second surface; and
      a false joint dividing the first and second surface and extending a predetermined depth of a third surface, the false joint having an interior angle and an exterior angle that is greater than the interior angle; and
      a first course of retaining wall blocks engaged with a second course of retaining wall blocks below;
   wherein the false joint has an exterior angle of greater than 40 degrees that extends for a predetermined distance over a length in the false joint.

10. The system retaining wall blocks of claim 9 wherein a depth of the interior angle of the false joint divided by a width of the interior angle of the of the false joint is greater than 2.

11. The system of retaining wall blocks of claim 9 wherein a depth of the interior angle of the false joint divided by a width of the interior angle of the of the false joint is less than 3.

12. The system of retaining wall blocks of claim 9 wherein the false joint has an interior angle of less than 20 degrees that extends for a predetermined distance over a length in the false joint.

13. The system of claim 9 wherein the first and second surface are textured.

14. The system of retaining wall blocks of claim 9 wherein the false joint extends a third or less of a depth of the body.

15. The system of retaining wall blocks of claim 9 further comprising the third surface having at least one engagement protrusion. wherein the at least one engagement protrusion of a first retaining wall block are configured to engage at least one engagement cavity of an adjacent retaining wall block.

16. The system of retaining wall blocks of claim 15 wherein the at least one engagement protrusion and the at least one engagement cavity of a retaining wall block in the first course and a retaining wall block in the second course are of different dimensions to allow the retaining wall block in the first course and the retaining wall block in the second course to be engaged.

17. The system of retaining wall blocks of claim 15, wherein the at least one engagement protrusion of a retaining wall block in the first course of retaining wall blocks is configured to engage with the at least one engagement cavity of a retaining wall block in the second course of retaining wall blocks below.

* * * * *